Figure 1:
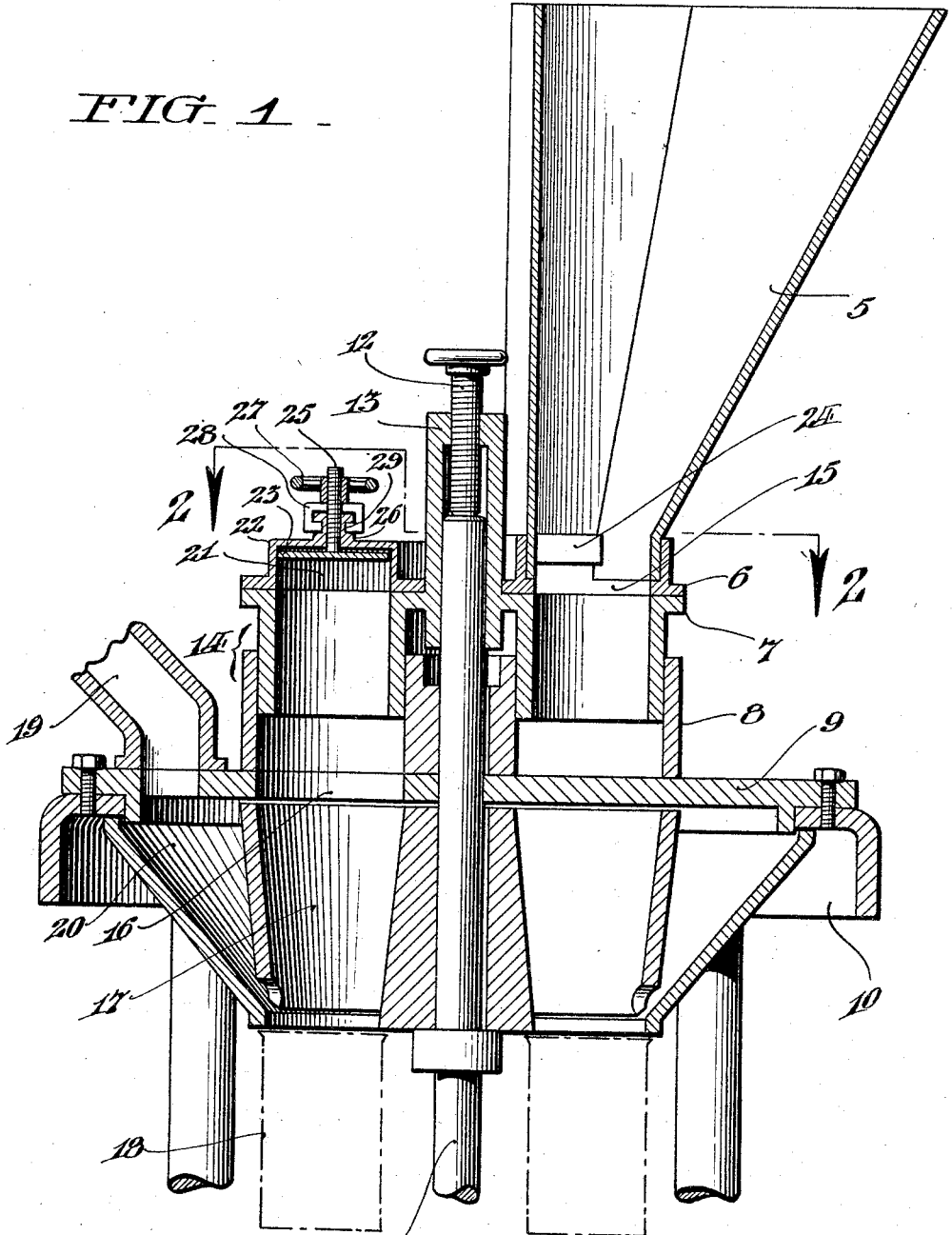

Dec. 25, 1928.

C. H. AYARS 1,696,376

CAN FILLING MACHINE

Filed March 24, 1927 2 Sheets-Sheet 1

WITNESSES

INVENTOR:
Charles H. Ayars,
BY
Joshua R H Potts
ATTORNEY

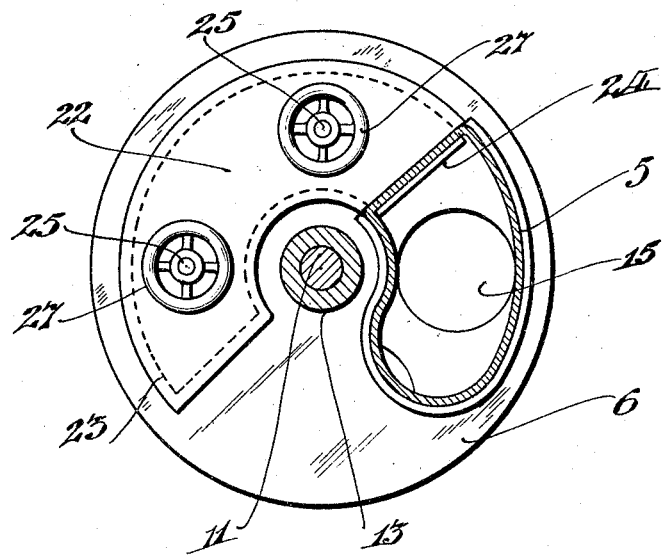
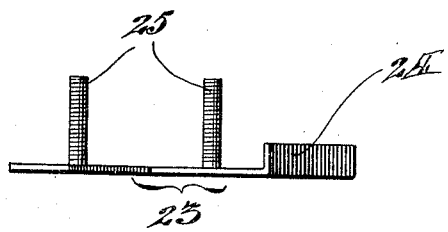

Patented Dec. 25, 1928.

1,696,376

UNITED STATES PATENT OFFICE.

CHARLES H. AYARS, OF SALEM, NEW JERSEY.

CAN-FILLING MACHINE.

Application filed March 24, 1927. Serial No. 177,870.

My invention relates to can filling machines and more particularly to machines of the type having rotatable turrets with measuring cups therein.

In can filling machines of this class, it is necessary that a relief channel be formed in the under side of the hopper plate between the hopper and the discharge opening so that a certain amount of material may be heaped above the top of each measuring cup to provide for inequalities in sizes of the material being measured, and to obtain an accurately measured quantity. This requirement has resulted in machines being manufactured to fill cans with certain classes of material only and the object of this invention is to provide certain improvements in machines of this type so that one machine may be used for filling cans with a wide variety of materials.

Another object of the invention is to so design a hopper plate that adjustment of the measured quantities may be quickly and accurately made and the moving parts made readily accessible for cleaning and inspection.

These objects, and other advantageous ends which will be described hereinafter, I attain in the following manner, reference being had to the accompanying drawings in which Figure 1 is a central vertical sectional view of a fragment of a can filling machine on which my invention has been installed, Figure 2 a top plan view of the hopper plate, taken substantially on line 2—2 on Figure 1, and Figure 3 an edge view of an element forming a part of my invention.

Referring now more in detail to the drawings, in which my invention has been shown applied to a can filling machine of the type covered by Letters Patent 1,533,536 issued to me on April 14, 1925, 5 represents a hopper into which the material to be canned is placed and which is supported on a hopper plate 6 resting on the top section 7 of the measuring wheel. A bed plate 9, which is suitably secured to the frame 10, supports the lower section 8 of the measuring wheel while top section 7, which telescopes into lower section 8, is supported on a shaft 11 and adapted to be raised and lowered, relatively to lower section 8, by means of a screw 12 threaded through an extension 13, formed on upper section 7, and abutting the top of shaft 11. Lower section 8 is keyed to shaft 11 and adapted to make contact with the top of plate 9 as it rotates while the top of top section 7 makes contact with the botom of hopper plate 6, thus effectively sealing in the contents of the measuring cups 14, during rotation of the measuring wheel.

Measuring cups 14 consecutively communicate with hopper 5 through an opening 15 formed in hopper plate 6 and are adapted to discharge their contents through an opening 16 formed in bed plate 9 and communicating with a funnel 17 which directs the material into cans 18 fed thereunder in the well known manner. Liquid is furnished to each can, as it comes into position below funnel 17, through a pipe 19 and chute 20 from a liquid measuring device, as fully described in the above mentioned patent.

In order that material in cups 14 may pass from hopper 5 to discharge opening 16 without being crushed, I provide a relief channel 21 which is preferably formed in hopper plate 6 by casting an angular structure 22 integral with the hopper plate. In canning peas and other small granular material, it is necessary to leave but a limited amount of head room in the relief channel while in canning larger granular material, such as beets and tomatoes, it is necessary to provide a greater amount of head room. In adapting the machine to handle almost any kind of material, I provide a filler plate 23 having an end flange 24 which extends upwardly in the hopper 5 and is adapted to cover the upper portion of relief channel 21 when filler plate 23 is lowered away from the top of structure 22 in order to prevent material from passing out of hopper 5 in relief channel 21 above the filler plate.

Adjustment of filler plate 21 is accomplished by means of two studs 25 secured to the upper side of the filler plate and extending through bosses 26 formed on structure 22. A hand wheel 27 is threaded onto each stud 25 and provided with oppositely extending arms 28 which are bent inwardly to engage an annular groove 29 formed in boss 26. It is evident that turning hand wheel 27 in one direction will raise filler plate 23, while turning the hand wheel in the opposite direction will force same downwardly due to arms 28 engaging groove 29.

While I have shown my improvement as applied on a certain type of machine, it is also employed on the type of machine shown in Letters Patent 1,480,335, issued to me on January 8, 1924, and it may be readily applied to other types of can filling machines; consequently I do not wish to limit myself to the precise construction set forth, but consider that I am at liberty to make such changes and alterations as fairly come within the appended claims.

Having thus described by invention, what I claim as new and desire to secure by Letters Patent is:—

1. In a can filling machine having a bed plate, measuring units movable on the bed plate, and a hopper above the measuring units; a hopper plate, having a relief channel formed therein, mounted between the measuring units and the hopper, and means for varying the depth of the channel.

2. In a can filling machine having a bed plate, measuring units movable on the bed plate, and a hopper above the measuring units; a hopper plate, having a relief channel formed therein, mounted between the measuring units and the hopper, a filler plate mounted in the channel for reducing its depth, and means for raising and lowering the filler plate.

3. In a can filling machine having a bed plate, measuring units movable on the bed plate, and a hopper above the measuring units; a hopper plate, having a relief channel formed therein, mounted between the measuring units and the hopper; a filler plate in the channel; studs on the filler plate extending through the hopper plate, and hand wheels threaded on the studs for raising and lowering the filler plate relatively to the hopper plate.

4. In a can filling machine having a bed plate, measuring units movable on the bed plate, and a hopper above the measuring units; a hopper plate, having a relief channel formed therein, mounted between the measuring units and the hopper; bosses, having an annular groove therein, formed on the hopper plate; a filler plate in the channel; studs on the filler plate extending through the bosses; hand wheels threaded on the studs, and arms on the hand wheels engaging the grooves in the bosses.

5. In a can filling machine having a bed plate, measuring units movable on the bed plate, and a hopper above the measuring units; a hopper plate, having a relief channel formed therein and communicating with the hopper, mounted between the measuring units and the hopper; a filler plate adjustably mounted in the relief channel, and a flange on the hopper end of the filler plate.

6. In a can filling machine having a bed plate with a discharge opening formed therein, measuring units movable on the bed plate, and a hopper above the measuring units; a hopper plate, having a relief channel extending from the hopper to a point above the discharge opening, mounted between the measuring units and the hopper; bosses, having annular grooves therein, formed on the hopper plate; a filler plate in the channel; a flange on the hopper end of the filler plate; studs on the filler plate extending through the bosses; hand wheels threaded on the studs; and arms on the hand wheels engaging the grooves in the bosses.

In testimony whereof I have signed my name to this specification.

CHARLES H. AYARS.